US012786127B2

(12) United States Patent
Saito et al.

(10) Patent No.: US 12,786,127 B2
(45) Date of Patent: Nov. 3, 2026

(54) SIGNAL PROCESSING AGGREGATION DEVICE, SIGNAL PROCESSING AGGREGATION SYSTEM, SIGNAL PROCESSING AGGREGATION METHOD AND PROGRAM

(71) Applicant: NTT, Inc., Tokyo (JP)

(72) Inventors: Shogo Saito, Musashino (JP); Kei Fujimoto, Musashino (JP)

(73) Assignee: NTT, Inc., Tokyo (JP)

( * ) Notice: Subject to any disclaimer, the term of this patent is extended or adjusted under 35 U.S.C. 154(b) by 45 days.

(21) Appl. No.: 18/881,395

(22) PCT Filed: Jul. 11, 2022

(86) PCT No.: PCT/JP2022/027325

§ 371 (c)(1),
(2) Date: Jan. 6, 2025

(87) PCT Pub. No.: WO2024/013829

PCT Pub. Date: Jan. 18, 2024

(65) Prior Publication Data

US 2025/0392547 A1 Dec. 25, 2025

(51) Int. Cl.

| | |
|---|---|
| ***H04L 47/122*** | (2022.01) |
| ***H04L 12/54*** | (2022.01) |
| *H04L 12/70* | (2013.01) |

(52) U.S. Cl.

CPC ............ *H04L 47/122* (2013.01); *H04L 12/56* (2013.01); *H04L 2012/5678* (2013.01)

(58) Field of Classification Search

CPC ....... H04L 67/51; H04L 67/12; H04L 1/0061; H04L 41/0823; H04L 41/12; H04L 41/14; H04L 41/5058; H04L 43/08; H04L 67/306; H04L 67/60; H04L 67/52; H04L 67/535; H04L 69/24; H04L 41/0816; H04L 5/0048; H04L 1/0057; H04L 67/133; H04L 47/24; H04L 43/0852; H04L 41/16; H04L 69/321; H04L 1/0009; H04L 1/0052; H04L 43/50; H04L 41/0806; H04L 43/0888;

(Continued)

(56) References Cited

U.S. PATENT DOCUMENTS

| | | | | |
|---|---|---|---|---|
| 2019/0068693 | A1* | 2/2019 | Bernat | G06F 9/505 |
| 2021/0081184 | A1* | 3/2021 | Azimi | G06F 8/4441 |
| 2023/0100152 | A1* | 3/2023 | Lal | G06N 3/063 706/25 |

OTHER PUBLICATIONS

Linux-Ha.osdn.jp [online], "Pacemaker Overview," available on or before Nov. 2015, retrieved on Mar. 2022, retrieved from URL<https://linux-ha.osdn.jp/wp/manual/pacemaker_outline>, 26 pages (with machine translation).

(Continued)

*Primary Examiner* — Djenane M Bayard
(74) *Attorney, Agent, or Firm* — Fish & Richardson P.C.

(57) ABSTRACT

A signal processing aggregation device which switches an offload destination accelerator when offloading specific processing of an application to an accelerator for calculation processing includes: an accelerator offload part which performs offloading on the installed accelerator or the accelerator on a remote server side on the basis of a set offload destination; and an accelerator remote offload part which serializes offload data to the accelerator on the remote server side, packetizes it in a predetermined format, and transmits it as packetized data.

5 Claims, 16 Drawing Sheets

(58) Field of Classification Search
CPC ... H04L 5/0053; H04L 49/90; H04L 67/1001; H04L 47/83; H04L 67/1014; H04L 67/148; H04L 69/40; H04L 9/0819; H04L 41/044; H04L 41/0896; H04L 41/5019; H04L 41/5025; H04L 43/065; H04L 43/0876; H04L 43/16; H04L 47/43; H04L 63/0428; H04L 67/1008; H04L 12/56; H04L 2012/5678; H04L 47/122; H04L 47/781; H04L 9/0894; H04L 2209/125; H04L 41/0213; H04L 41/0668; H04L 41/0677; H04L 41/0893; H04L 41/0895; H04L 41/142; G06F 2209/509; G06F 21/16; G06F 9/5061; G06F 15/80; G06F 9/5044; G06F 21/602; G06F 9/5027; G06F 11/3409; G06F 21/1063; G06F 9/5077; G06F 11/3006; G06F 21/53; G06F 9/547; G06F 21/64; G06F 9/5072; G06F 9/522; G06F 11/3442; G06F 11/3466; G06F 13/4022; G06F 21/105; G06F 2200/201; G06F 2201/86; G06F 2201/885; G06F 2209/5011; G06F 9/28; G06F 9/44; G06F 9/4401; G06F 9/4856; G06F 9/505; G06F 9/5088; G06F 21/57; G06F 9/5055; G06F 12/1054; G06F 12/1063; G06F 15/1735; G06F 2201/85; G06F 2209/5019; G06F 2212/1044; G06F 2213/0064
See application file for complete search history.

(56) References Cited

OTHER PUBLICATIONS

Markthub et al., "Serving More GPU Jobs, with Low Penalty, using Remote GPU Execution and Migration," IEEE International Conference on Cluster Computing, Sep. 12-16, 2016, Taipei, Taiwan, 485-488.

* cited by examiner

SIGNAL PROCESSING AGGREGATION DEVICE, SIGNAL PROCESSING AGGREGATION SYSTEM, SIGNAL PROCESSING AGGREGATION METHOD AND PROGRAM

CROSS-REFERENCE TO RELATED APPLICATIONS

This is a National Stage Application of PCT Application No. PCT/JP2022/027325, filed on Jul. 11, 2022. The disclosure of the prior application is considered part of the disclosure of this application, and is incorporated in its entirety into this application.

BACKGROUND

Technical Field

The present invention relates to a signal processing aggregation device, a signal processing aggregation system, a signal processing aggregation method and a program.

Background Art

In mobile communication wireless access systems, the transmission timing of wireless signals between the terminal and the base station is managed using the medium access control (MAC) scheduler in the base station as a resource multiplexed in the time domain and frequency domain and is realized by assigning an appropriate resource element (RE) to each terminal.

An overview of a wireless access system will be described.

FIG. 14 is a diagram for explaining the overview of the wireless access system.

As shown in FIG. 14, the wireless access system includes a user terminal (user equipment: UE) 10, an antenna (base station antenna) 20, a base station (base band unit: BBU) 30, and a core network 40.

UE 10 includes a plurality of pieces of UE1, UE2, UE3, . . . , UEn (n is any natural number) and the base station 30 assigns and manages REs (refer to the hatching or shading in FIG. 14: the hatching or shading pattern indicates the different REs) for each of the UEs. Note that, when a pieces of UE1, UE2, UE3, . . . , UEn are collectively referred to as the UE 10.

The antenna 20 is an antenna and a transmitting/receiving part which wirelessly communicates with the UE 10 (hereinafter, an "antenna" is a general term for the antenna, the transmitting/receiving part and a power supply part thereof). Transmission and reception data is connected to the base station 30 through, for example, a dedicated cable.

The base station 30 is a stationary wireless station located on land in which it communicates with the UE 10. The base station 30 is dedicated hardware (dedicated device) which performs wireless signal processing. Alternatively, the base station 30 is a virtual radio access network (vRAN) in which a general-purpose server performs wireless signal processing in a long term evolution (LTE) or five generation (5G) signal processing aggregation system. In vRAN (which will be described later), general-purpose servers which are inexpensive and available in large quantities can be used as hardware for the base station 30.

The base station 30 includes hardware (HW) 31, an OS or the like 32, and a base station processing application 33.

A core network 40 is an evolved packet core (EPC)/(in the following explanation, "/" represents "or") 5G core (5GC) network or the like.

<vRAN> vRAN will be explained.

In signal processing aggregation systems for mobile communications, high delay requirements and throughput are required. Thus, base stations (BBUs) which perform wireless signal processing are generally supported with dedicated hardware (dedicated device).

In recent years, with the spread of general-purpose servers (intel architecture (IA) servers (Intel: trademark)), the performance of general-purpose servers has improved dramatically and it has become possible to obtain them at low cost through mass production. Thus, studies are progressing on vRAN which uses general-purpose servers to perform BBU wireless signal processing in LTE and 5G signal processing aggregation systems.

In vRAN, general-purpose servers which are inexpensive and available in large quantities can be used as BBU hardware. Thus, a BBU pool can be constructed by setting up a local data center (DC) or communication building within several 10 km from the antenna as a central location and by setting up server racks and installing multiple general-purpose servers in advance (this concept sometimes called a centralized-RAN (C-RAN)).

Since the BBU pool allows a user to prepare a plurality of base station hardware (general-purpose servers) in advance, it has the potential advantage of enabling flexible operations such as rapid hardware replacement (switching) in the event of a hardware failure and dynamic scale-out/in in response to increases and decreases in traffic.

FIG. 15 is a diagram for explaining an overview of the signal processing device in the base station 30 of the wireless access system of FIG. 14. The same constituent parts as those in FIG. 14 are denoted by the same reference symbols.

The server 70 shown in FIG. 15 is a distributed unit (DU) server (signal processing device) when base station functions are separated into a radio unit (RU)/a DU/a centralized unit (CU).

The server 70 includes a central processing unit (CPU) 51, an accelerator 52, and a network interface card (NIC) 53.

For CPUs and accelerators, the workloads which they are good at (high processing power) differ depending on the type of processor. In contrast to highly versatile CPUs, there are accelerators (hereinafter referred to as ACCs as appropriate) such as a field programmable gate array (FPGA)/(In the following explanation, "/" represents "or") graphics processing unit (GPU)/application specific integrated circuit (ASIC) which can quickly and efficiently compute highly parallel workloads with which CPUs are weak (low processing power). An offloading technique is being used for improving overall computation time and efficiency by combining these different types of processors, offloading workloads which are difficult for the CPU to the ACC, and performing calculation.

In cases such as a virtual radio access network (vRAN), when the performance of the CPU alone is insufficient to satisfy the requirements, some processing is offloaded to accelerators capable of high-speed calculation such as FPGA and GPU.

In FIG. 15, the CPU 51 offloads the processing of error correction codes and the like to the accelerator 52 and performs the calculations on the accelerator, and then the CPU 51 acquires the calculation results again.

As a technique for aggregating signal processing parts in response to an amount of communication or when failure occurs, there is a server device aggregation/switching technique shown in FIG. 16.

NPL 1 describes a technique for "changing the server device which establishes a session such as during a server failure".

FIG. 16 is a diagram for explaining the server device aggregation/switching technique described in NPL 1. The same constituent parts as those in FIG. 15 are denoted by the same reference symbols.

As shown in FIG. 16, the server 70 is a general-purpose server signal processing device (vDU) installed in a base station and has an active system and a standby system. The server 70 includes a CPU 51, an accelerator 52, and a NIC 53 on the hardware 50, and has a signal processing application 1 on the software 60.

The server 70 is a high-performance device which processes all L1 processing (forward error correction (FEC) and fronthaul (FH) functions of L1 baseband processing and the like) using an accelerator. The accelerator 52 may consume a large amount of power even when there is no data processing.

Signal processing devices (vDUs) are aggregated in response to an amount of communication or when failure occurs. Specifically, this aggregation involves changing the accommodation of the antenna devices 20 (symbol a in FIG. 16).

Related Art

Non Patent Literature

[NPL 1] Linux-HA Japan, [online], [Retrieved Jun. 6, 2022], Internet <https://linux-ha.osdn.jp/wp/manual/pacemaker_outline>

SUMMARY OF INVENTION

Technical Problem

An existing technique can satisfy <Requirement 1: Resource saving> because it can reduce the number of signal processing devices in operation depending on the amount of communication. However, this does not satisfy <Requirement 2: Availability> because a temporary disconnection of user terminals occurs due to time resynchronization associated with fronthaul switching. Furthermore, switching requires a reconnection function to a different signal processing device in the antenna part which does not satisfy <Requirement 3: Use of existing device>.

In addition, the signal processing device (vDU) aggregation technique shown in FIG. 16 has the following disadvantages 1 to 4. That is to say, the user terminal (UE) 10 has Disadvantage 1 of having a large impact on the user such as session disconnection during switching. Furthermore, the server 70-2 (signal processing device (vDU)) at the aggregation destination has Disadvantage 2 in that minimizing communication interruptions requires new functions which satisfy strict performance requirements such as high-speed wireless state transition.

In addition, there is Disadvantage 3 in that, when changing the accommodation of the antenna device 20 (reference symbol a in FIG. 16), it is necessary to take into account the operation of fronthaul NW assignment/switching. Disadvantage 4 is that resynchronization processing and HARQ feedback readjustment occur due to fronthaul NW switching.

The present invention was made in view of this background, and an object of the present invention is to dynamically aggregate signal processing to a part of calculation resources without making changes to user terminals, signal processing devices, and antenna devices.

Solution to Problem

In order to achieve the object described above, a signal processing aggregation device which switches an offload destination accelerator when offloading specific processing of an application to an accelerator for calculation processing includes: an accelerator offload part which performs offloading on the installed accelerator or the accelerator on a remote server side on the basis of a set offload destination; and an accelerator remote offload part which serializes offload data to the accelerator on the remote server side, packetizes it in a predetermined format, and transmits it as packetized data.

Advantageous Effects of Invention

According to the present invention, signal processing can be dynamically aggregated in part on calculation resources without changing user terminals, signal processing devices, and antenna devices.

DESCRIPTION OF EMBODIMENTS

A signal processing aggregation system and the like in an embodiment of the present invention (hereinafter referred to as an "embodiment") will be explained below with reference to the drawings.

First Embodiment

[Overview]

Figure 1:
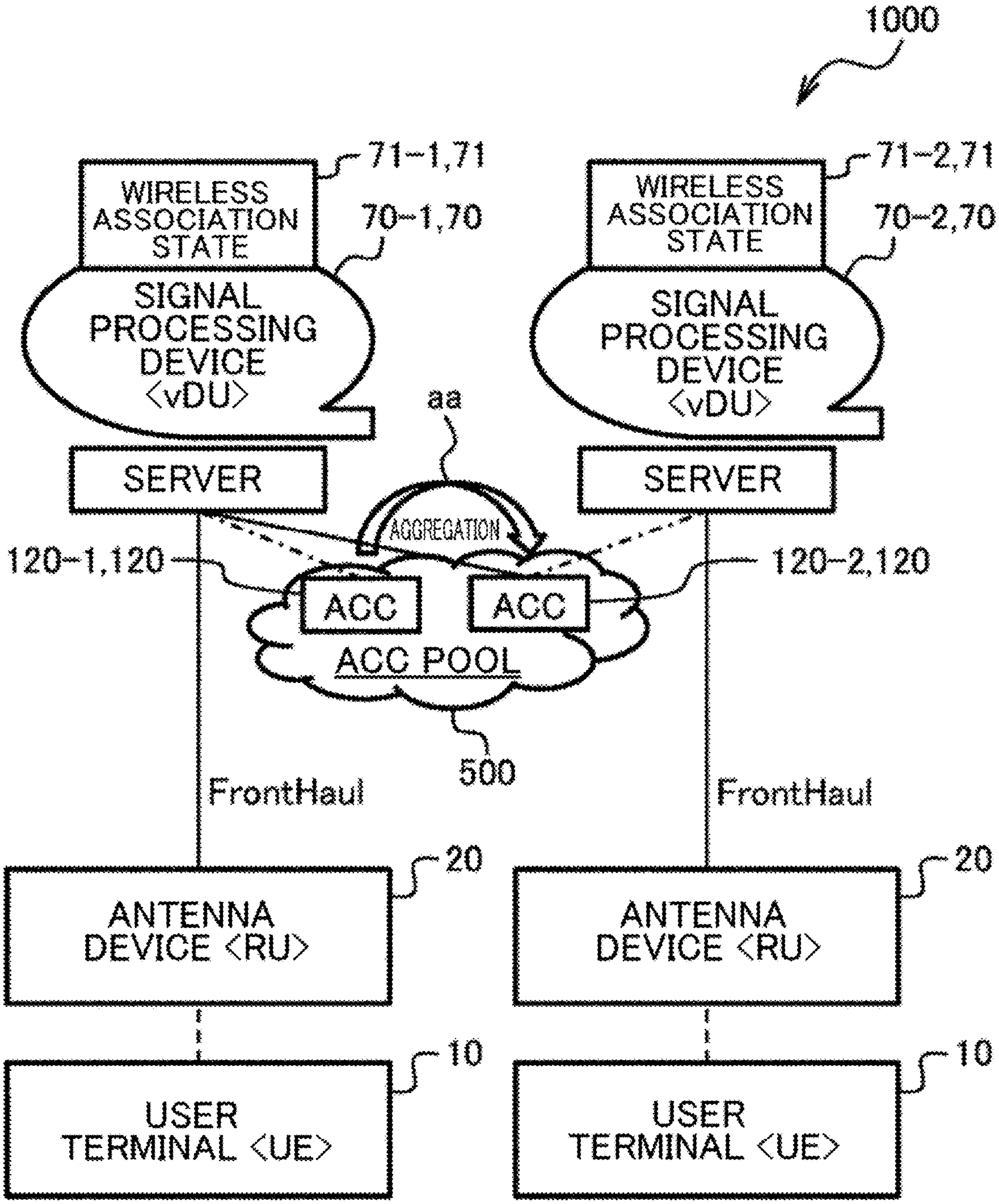
FIG. 1 is a schematic diagram showing a concept of an ACC pool of a signal processing aggregation system according to a first embodiment of the present invention.
Figure 16:
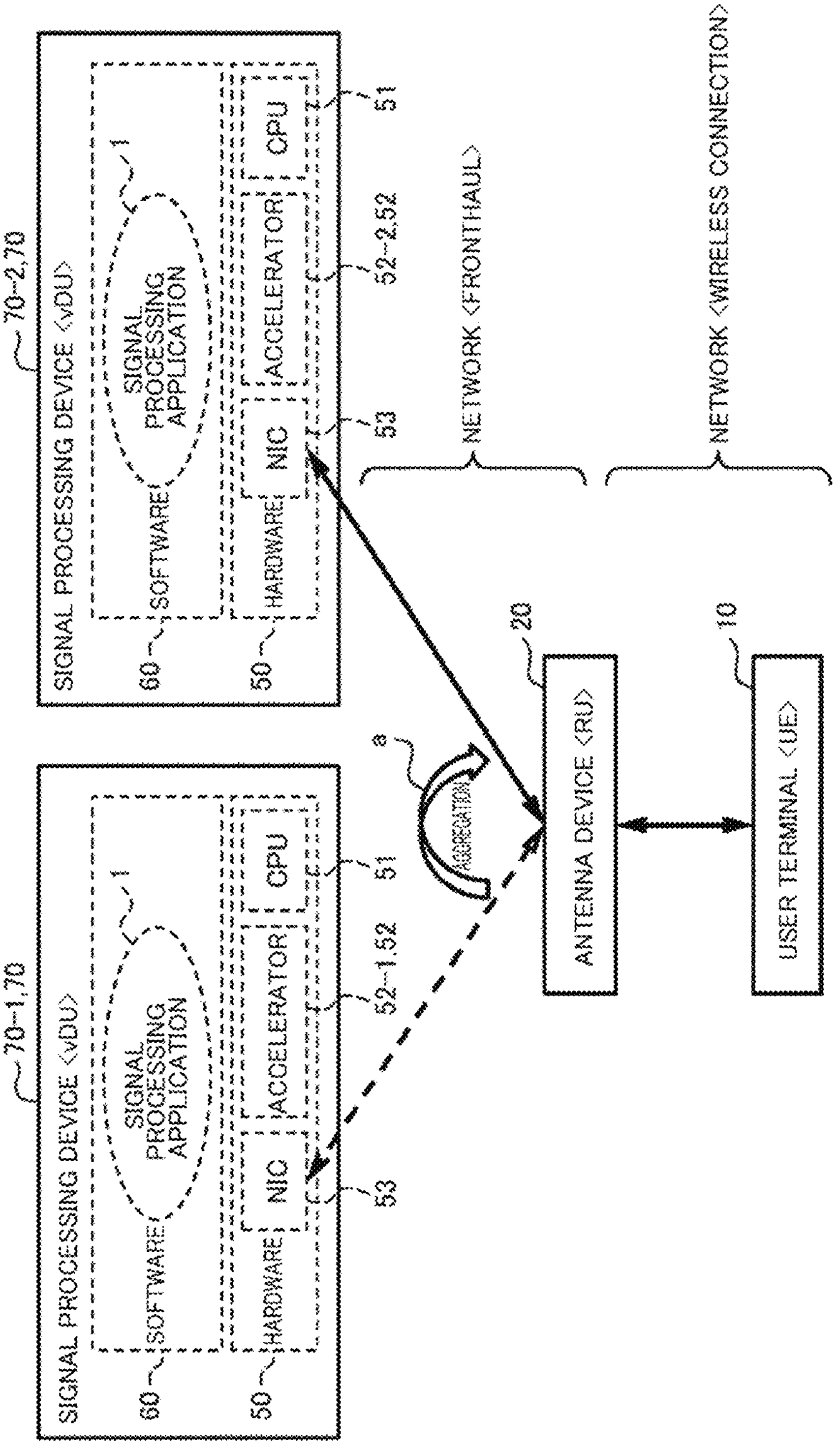
FIG. 16 is a diagram for explaining a server device aggregation/switching technique described in NPL 1.

FIG. 1 is a schematic diagram showing a concept of an ACC pool of a signal processing aggregation system according to a first embodiment of the present invention. The embodiment is applicable to a signal processing aggregation system for EPC/5GC mobile communication. The same constituent parts as those in FIG. 16 are denoted by the same reference symbols.

As shown in FIG. 1, a signal processing aggregation system 1000 includes a user terminal (UE) 10, an antenna device (RU) 20, an ACC pool 500 (accelerator pool) which pools a plurality of accelerators (ACCs) 120-1, 120-2 (ACC 120 when used collectively), signal processing devices (vDUs) 70-1, 70-2 (signal processing device 70 when used collectively) installed on a server, and wireless association states 71-1, 71-2 which store states of the signal processing devices (vDUs) 70-1, 70-2.

Note that, for convenience of explanation, although the signal processing devices (vDUs) 70-1, 70-2 and the wireless association states 71-1, 71-2 are displayed outside the server, the signal processing devices (vDUs) 70-1, 70-2 and the wireless association states 71-1, 71-2 are located in the server (the server itself). The servers 70-1, 70-2 will be explained below as signal processing devices (vDUs) 70-1, 70-2.

The signal processing aggregation system 1000 aims at aggregation in accelerator units by pooling a plurality of ACCs 52 in the ACC pool 500 (<Feature 1>) and since the signal processing device (vDU) 70 includes the signal processing aggregation device 100 (which will be described later) accommodation changes between servers and accelerators are enabled (<Feature 2>).

The signal processing aggregation system 1000 has the following advantages 1 to 3.

Advantage 1: Since there is no need to switch the vDU itself, the impact on users during switching is small. That is to say, there is no disconnection associated with fronthaul network switching and the impact on users during switching is small.

Advantage 2: Since there is no fronthaul switching and there is no effect on the wireless state, changes to the fronthaul and the antenna part are small. For example, changes to signal processing device applications and antenna devices are small.

Advantage 3: No need to switch fronthaul NW.

[Schematic Configuration]

Figure 2:
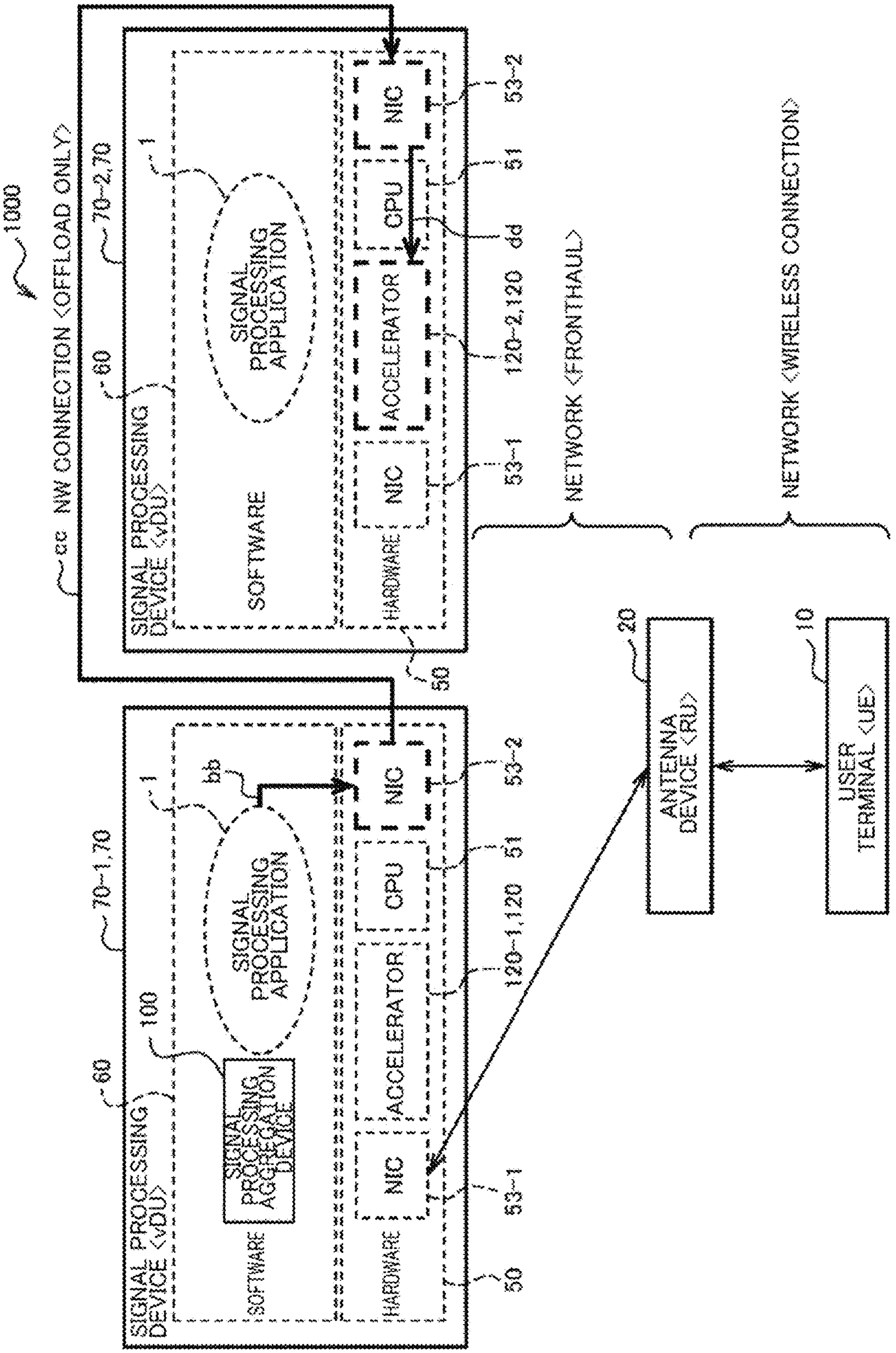
FIG. 2 is a diagram showing a schematic configuration of a signal processing aggregation system according to the first embodiment of the present invention.

FIG. 2 is a diagram showing a schematic configuration of a signal processing aggregation system according to the first embodiment of the present invention. The same constituent parts as those in FIGS. 1 and 16 are denoted by the same reference symbols.

As shown in FIG. 2, in the base station of the signal processing aggregation system 1000, a server signal processing device (vDU) 70-1 and a server signal processing device (vDU) 70-2 are connected through a network dedicated to offloading.

The signal processing device (vDU) 70-1 includes a CPU 51, an accelerator 120-1, and NICs 53-1, 53-2 on the hardware 50 and has a signal processing application 1 and a signal processing aggregation device 100 on the software 60.

The signal processing device (vDU) 70-2 includes a CPU 51, an accelerator 120-2, and NICs 53-1, 53-2 on the hardware 50 and has a signal processing application 1 on the software 60.

The signal processing aggregation device 100 offloads the signal processing of the signal processing application 1 to the accelerator 120-1 installed in the same server or on the accelerator 120-2 of a remote server <2> on the basis of the offload destination set in advance using the resource aggregation determination part 140 (which will be described later). That is to say, the signal processing aggregation device 100 offloads the signal processing of the signal processing application 1 to the accelerator 120-2 (symbol dd in FIG. 2) via the NIC 53-2 (symbol bb in FIG. 2), NW connection (offload only) (symbol cc in FIG. 2), and the NIC 53-2.

The base station of the signal processing aggregation system 1000 realizes the aggregation of calculation resources without affecting the communication of user terminals by the following <Feature 1> and <Feature 2>.

<Feature 1>: Resource aggregation which does not affect user connections by aggregating accelerator processing between cases A pool is created by separating only the accelerator 120 from the server. Calculation resources of accelerators are aggregated without changing the front and rear networks. Thus, the power consumption of the calculation resources of the signal processing device can be reduced without affecting the connection of the user terminal.

By aggregating only accelerator processing between servers, resource aggregation can be achieved without changing a fronthaul or an antenna device. There is no fronthaul switching and resource aggregation is possible without affecting users. <Requirement 2: Availability> and <Requirement 3: Use of existing device> are satisfied.

<Feature 2>: Determination of inter-cases offloading based on estimation for amount of communication The signal processing aggregation device 100 determines offloading of accelerator processing between cases on the basis of the estimation result of the amount of communication. By controlling the power supply of the accelerator during offloading, <Requirement 1: Resource and power saving> is satisfied.

The above <Feature 1> and <Feature 2> will be explained in detail below.

[Overall Configuration]

Figure 3:
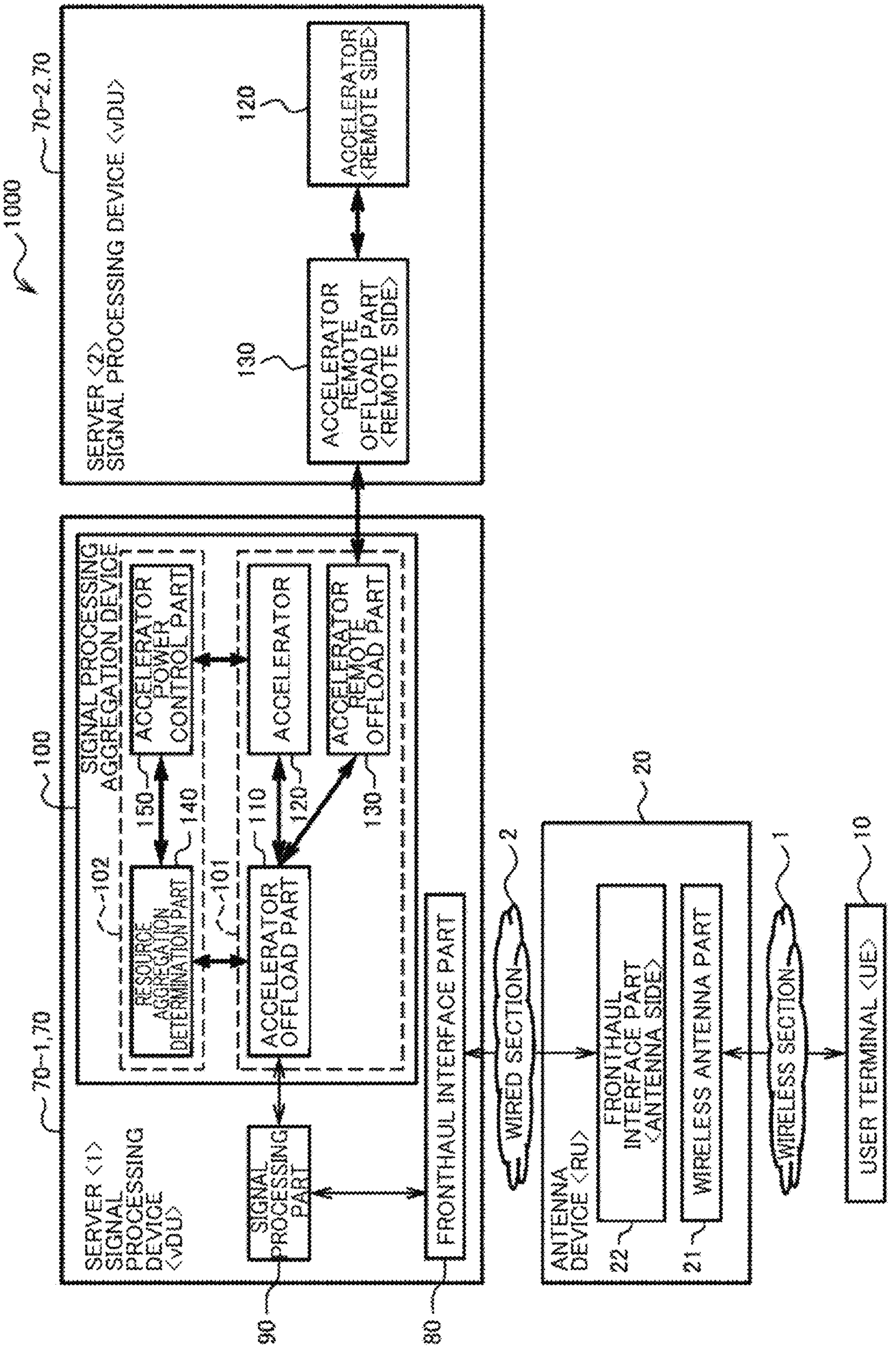
FIG. 3 is a configuration diagram of a signal processing aggregation device of the signal processing aggregation system according to the first embodiment of the present invention.

FIG. 3 is a configuration diagram of the signal processing device (vDU) 70 of FIG. 2.

As shown in FIG. 3, the signal processing device (vDU) 70-1 of Server <1> includes a fronthaul interface part 80, a signal processing part 90, and a signal processing aggregation device 100.

The fronthaul interface part 80 of the signal processing device (vDU) 70-1 is connected to the fronthaul interface part (antenna side) 220 of the antenna device (RU) 20 via Wired Section 2. The signal processing device (vDU) 70-1 corresponds to the back end of the antenna device (RU) 20.

The signal processing device (vDU) 70-1 of Server <1> is connected to the signal processing device (vDU) 70-2 of Server <2> via, for example, a dedicated network (symbol cc in FIG. 2) capable of high-speed communication.

The signal processing device (vDU) 70-2 of Server <2> includes an accelerator (remote side) 120 and an accelerator remote offload part (remote side) 130.

[User Terminal (UE) 10]

The user terminal 10 is a wireless device such as a mobile phone terminal and is connected to the antenna device 20 via Wireless Section 1.

The user terminal 10 converts data to be transmitted into a wireless signal and transmits it to the antenna device 20. The user terminal 10 processes the wireless signal received from the antenna device 20 and restores it to the data intended by the transmission source.

There are two types of communication between the user terminal 10 and the antenna device 20 such as an uplink (user terminal 10→antenna device 20→signal processing device 70-1) and a downlink (signal processing device 70-1→antenna device 20→user terminal 10).

[Antenna Device (RU) 20]

The antenna device (RU) 20 includes a wireless antenna part 21 and a fronthaul interface part (antenna side) 22. The wireless antenna part 21 is connected to the user terminal (UE) 10 via Wireless Section 1 and connected to the signal processing device 70-1 via Wired Section 2.

<Wireless Antenna Part 21>

The wireless antenna part 21 is a base station for the user terminal 10 and transmits and receives wireless signals to and from the user terminal 10.

The wireless antenna part 21 performs calculation processing on a portion of the wireless signal received from the user terminal 10, and then transmits the signal to the signal processing device 70-1 of Server <1>.

The wireless antenna part 21 performs the following transmission and reception with the user terminal 10.

Downlink: A wireless signal is transmitted to the user terminal 10.

Downlink: Signal data is received from the fronthaul interface part (antenna side) 22.

Uplink: A wireless signal is received from the user terminal 10.

Uplink: Signal data is transmitted to the fronthaul interface part (antenna side) 22.

<Fronthaul Interface Part (antenna side) 22>

The fronthaul interface part (antenna side) 22 is a network interface for connecting the antenna device 20 to the signal processing device (vDU) 70-1 and takes the form of allowing wired communication.

The fronthaul interface part (antenna side) 22 transmits and receives data to and from the fronthaul interface part (signal processing device side) 80 and notifies the wireless antenna part 21 of the data.

In the uplink, the fronthaul interface part (antenna side) 22 transmits the data having a notification from the wireless antenna part 21 to the fronthaul interface part (signal processing device side) 80. Furthermore, in the downlink, the fronthaul interface part (antenna side) 22 notifies the wireless antenna part 21 of the data having a notification from the fronthaul interface part (signal processing device side) 80.

First, the signal processing device (vDU) 70-1 of Server <1> will be explained.

[Signal Processing Device (vDU) 70-1]

The signal processing device (vDU) 70-1 includes a fronthaul interface part (signal processing device side) 80, a signal processing part 90, and a signal processing aggregation device 100.

<Fronthaul Interface Part (Signal Processing Device Side) 80>

The fronthaul interface part (signal processing device side) 80 is a network interface for connecting the signal processing device 70-1 with the antenna device 20 and takes the form of a wired connection.

The fronthaul interface part (signal processing device side) 80 transmits and receives data to and from the fronthaul interface (antenna side) 22 of the antenna device 20 and notifies the signal processing part 90 of the data.

In the uplink, the fronthaul interface part (signal processing device side) 80 receives data having a notification from the fronthaul interface (antenna side) 22 of the wireless antenna device 20 and notifies the signal processing part 90 of the data. In the downlink, the fronthaul interface part (signal processing device side) 80 transmits the data having a notification from the signal processing part 90 to the fronthaul interface (antenna side) 22 of the antenna device.

<Signal Processing Part 90>

The signal processing part 90 performs signal processing of the wireless signal and performs calculation processing for mutually converting between the wireless signal and the data to be communicated. The signal processing part 90 notifies the accelerator offload part 110 of offload data (signal data) to offload some processing to the accelerator.

The signal processing part 90 transmits and receives wireless signals to be processed to and from the fronthaul interface part 80. The signal processing part 90 offloads some signal processing to the accelerator offload part 110.

[Signal Processing Aggregation Device 100]

The signal processing aggregation device 100 switches the offload destination accelerator when offloading specific processing of an application to an accelerator for calculation processing.

The signal processing aggregation device 100 includes an accelerator offload part 110, an accelerator 120, an accelerator remote offload part 130, a resource aggregation determination part 140, and an accelerator power control part 150.

The accelerator offload part 110, the accelerator 120, and the accelerator remote offload part 130 constitute an availability function part 101 which realizes <Requirement 2: Availability>.

The resource aggregation determination part 140 and the accelerator power control part 150 constitute the power saving function part 102 which realizes <Requirement 1: Resource saving and power saving>.

<Accelerator Offload Part 110>

The accelerator offload part 110 performs offloading on the installed accelerator 120 or the accelerator 120 on the remote server side on the basis of the set offload destination.

The accelerator offload part 110 performs offloading on the accelerator 120 on the basis of the input from the signal processing part 90. The accelerator offload part 110 performs offloading on the accelerator 120 via the accelerator 120 installed in the same server or on the accelerator remote offload part 130 of remote Server <2> on the basis of the offload destination set in advance using the resource aggregation determination part 140.

The accelerator offload part 110 receives signal data to be processed from the signal processing part 90 as an input. In an example in vRAN, it refers to data to be processed including an error correction code in the case of forward error correction (FEC).

The accelerator offload part 110 sends the calculation result to signal processing part 90 as an output. In the example in vRAN, it refers to corrected data that has undergone FEC processing and does not include an error correction code.

The accelerator offload part 110 transmits the signal data to be processed received from the signal processing part 90 to the accelerator 120 and the accelerator remote offload part 130 and receives the calculation results.

<Accelerator 120>

The accelerator 120 is accelerator hardware which is installed in Server <1> and is specialized for specific calculations and performs calculations on the basis of instructions from the accelerator offload part 110.

The accelerator 120 receives "data to be processed" from the accelerator offload part 110 as an input. In the example in vRAN, it refers to data to be processed including error correction codes in the case of FEC. The accelerator 120 notifies the accelerator offload part 110 of the "calculation result" as an output. In the example in vRAN, corrected data which has undergone FEC processing and does not include an error correction code is passed.

The accelerator may have an internal task processing queue and may have separate input instructions for calculation (enqueue processing) and output instructions for processing results (dequeue instruction).

The accelerator 120 may be in any form such as a graphic processing unit (GPU), a field programmable gate array (FPGA), an application specific integrated circuit (ASIC), or a dedicated program which operates on a central processing unit (CPU).

<Accelerator Remote Offload Part 130>

The accelerator remote offload part 130 serializes signal data (offload data) to be processed using the accelerator (remote side) 120 on the remote server side, packetizes it in a predetermined format, and transmits it as packetized data.

The accelerator remote offload part 130 packetizes offload data to the accelerator 120, sends it to Remote Server <2> via the network, and requests processing.

After serializing the input data, the accelerator remote offload part 130 divides it into packets according to user datagram protocol (UDP)/internet protocol (IP) format or the like and notifies the accelerator remote offload part (remote side) 130 of it.

The accelerator remote offload part 130 receives signal data to be processed from the accelerator 120 as an input. In the example in vRAN, it refers to data to be processed including error correction codes in the case of FEC.

The accelerator remote offload part 130 transmits packetized data of function name and argument data to the accelerator remote offload part (remote side) 130 as an output.

The accelerator remote offload part 130 passes "function name/argument data" as an output to the resource aggregation determination part 140 and receives the calculation result as an input.

Figure 4:
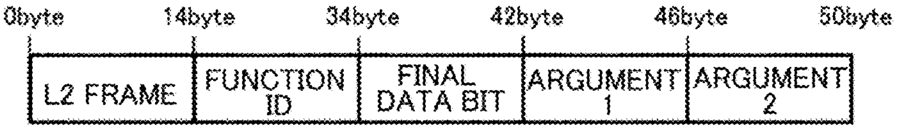
FIG. 4 is a diagram showing an example of a data structure handled by an accelerator remote offload part of the signal processing aggregation device of the signal processing aggregation system according to the first embodiment of the present invention.

FIG. 4 is a diagram showing an example of the data structure of data handled by the accelerator remote offload part 130. FIG. 4 shows data including data to be processed and a function name corresponding to the processing as an example in vRAN.

The data structure shown in FIG. 4 includes an ID which uniquely identifies the function, an argument which includes the data to be processed, and a final data bit which identifies whether it is the last division unit when the data is divided into a plurality of units during data transfer.

<Resource Aggregation Determination Part 140>

The resource aggregation determination part 140 determines whether to perform resource aggregation of the accelerator 120 on the basis of the "amount of processing to be offloaded to the accelerator" of the signal data to be processed. Specifically, the resource aggregation determination part 140 determines whether to aggregate accelerator resources based on the estimation result of the signal amount to be processed after a certain period of time.

In this embodiment, the amount of traffic is used as "the amount of processing to be offloaded to the accelerator". Any index may be used as a basis for determining the aggregation of accelerator resources and may be other than the amount of traffic such as "the amount of load on the accelerator or the amount of offload from the CPU". Note that the amount of traffic and the "amount of processing to be offloaded to the accelerator" have a relationship such that "the amount of processing to be offloaded increases or decreases according to the amount of traffic".

When it is assumed that the traffic is at less than a certain level, the resource aggregation determination part 140 instructs the accelerator offload part 110 with respect to the aggregation destination to aggregate the processing to a remote location using the accelerator remote offload part 130. At this time, the accelerator power control part 150 is instructed to save power on the unused accelerator power supply, thereby reducing power consumption.

Figure 8:
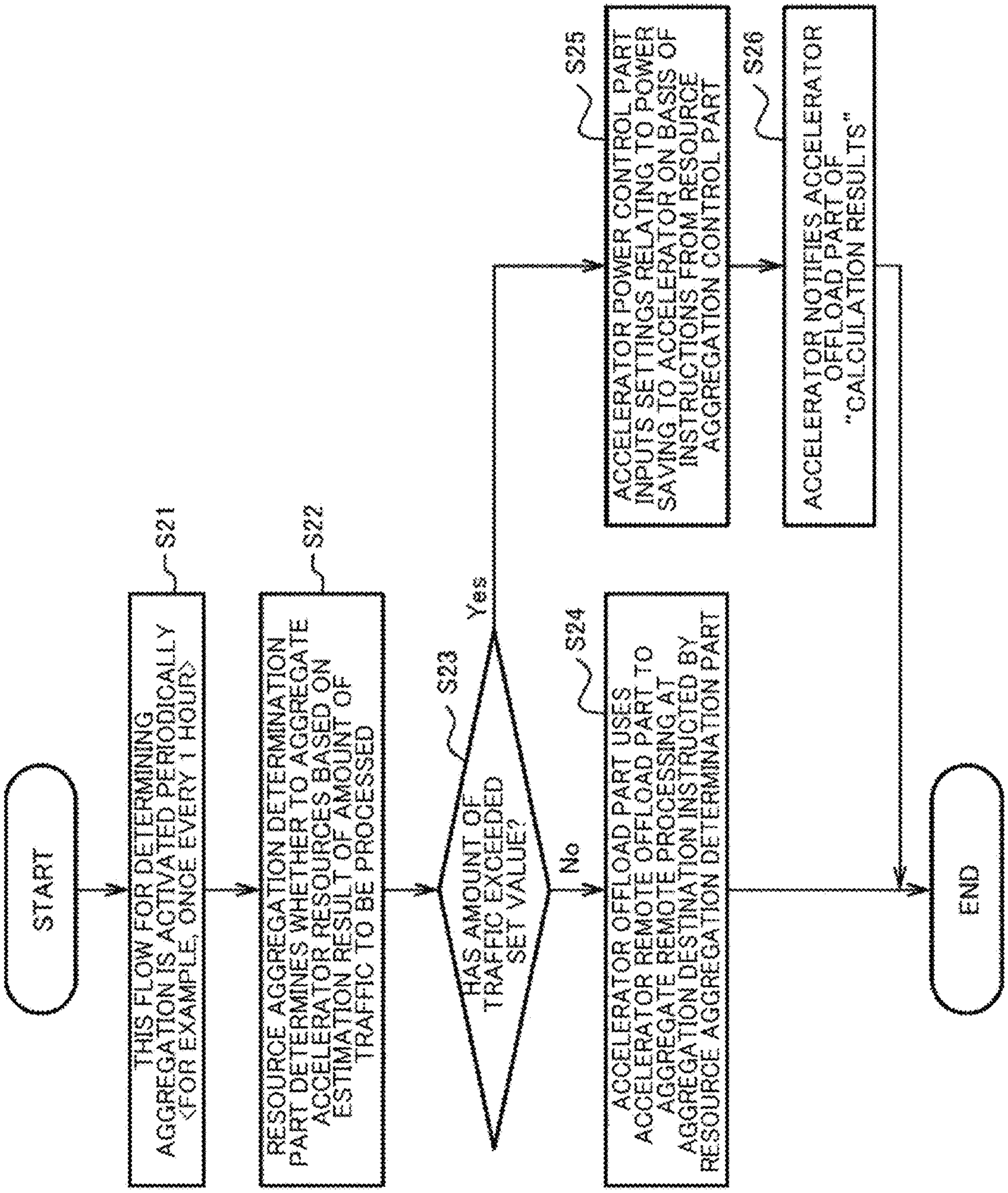
FIG. 8 is a flowchart for describing <Sequence 2> in calculation offloading when resource aggregation is performed using the signal processing aggregation device of the signal processing aggregation system according to the first embodiment of the present invention.

There is a form in which the resource aggregation determination part 140 is periodically performed at regular time intervals, as shown in Sequence 2 (FIG. 8). As another variation, it is activated when the prediction result of the traffic prediction part 210 (which will be described later) fluctuates by a certain amount or more. When it is assumed that the traffic is higher than a certain level, the resource aggregation determination part 140 instructs the accelerator offload part 110 to cancel aggregation and causes a local accelerator 120 to perform processing. At this time, the resource aggregation determination part 140 instructs the accelerator power control part 150 to cancel the power saving mode of the locally installed accelerator power supply.

The criteria for determining resource aggregation may be determined on the basis of the performance and the availability of calculation resources in addition to the amount of traffic ("the amount of processing to be offloaded to the accelerator").

<Accelerator Power Control Part 150>

The accelerator power control part 150 inputs settings relating to power saving to the installed accelerator 120 or the accelerator (remote side) 120 on the remote server side on the basis of instructions from the resource aggregation determination part 140. As the power saving settings having a notification provided to the accelerator 120, "turning off the power", "setting the operating frequency", and "writing small circuits for field programmable gate arrays (FPGAs)" are exemplified as setting contents.

The accelerator power control part 150 receives a notification of power saving settings from the resource aggregation determination part 140 as an input. As an output, the accelerator power control part 150 instructs the accelerator 120 to perform power saving settings.

The signal processing device (vDU) 70-2 of Server <2> will be explained below.

[Signal Processing Device (vDU) 70-2]

The signal processing device (vDU) 70-2 includes an accelerator (remote side) 120 and an accelerator remote offload part (remote side) 130.

<Accelerator (Remote Side) 120>

The accelerator (remote side) 120 is accelerator hardware which is installed in Server <2> and is specialized for specific calculations and performs calculations on the basis of instructions from the accelerator remote offload part (remote side) 130.

The accelerator (remote side) 120 receives "data to be processed" from the accelerator remote offload part (remote side) 130 as an input. As an output, the accelerator (remote side) 120 notifies the accelerator remote offload part (remote side) 130 of the "calculation result".

Although an accelerator device installed in another vDU device is used in this embodiment, an offload dedicated server including only an accelerator may also be used.

<Accelerator Remote Offload Part (Remote Side) 130>

The accelerator remote offload part (remote side) 130 performs calculation offloading on the accelerator (remote side) 120 on the basis of the packet group of "function name/argument data". The accelerator remote offload part (remote side) 130 combines a plurality of input packets and restores them into the form of an ID which uniquely identifies a function and arguments. The accelerator remote offload part (remote side) 130 instructs the accelerator (remote side) 120 to perform calculations by performing a function of sending data to the accelerator (remote side) 120 on the basis of the ID which uniquely identifies this function and the arguments.

Figure 5:
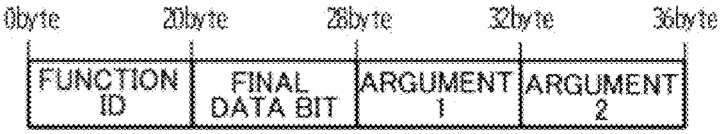
FIG. 5 is a diagram showing an example of a data structure for inter-function exchange of function IDs and argument data of the signal processing aggregation device of the signal processing aggregation system according to the first embodiment of the present invention.

The data structure of data handled by the accelerator remote offload part (remote side) 130 is the same as that shown in FIG. 4 as an example in vRAN. That is to say, as shown in FIG. 5, the data structure of the data handled by the accelerator remote offload part (remote side) 130 includes the format of a packet which includes data to be processed and a function name corresponding to the processing. In the example in vRAN, it refers to data to be processed including an error correction code in the case of forward error correction (FEC).

FIG. 5 is a diagram showing an example of a data structure for inter-function exchange of function IDs and argument data. As shown in the data structure shown in FIG. 4, the calculation result includes the name of the performed function (function ID) and the result of the processing (Argument 1, Argument 2). In the example in vRAN, it refers to corrected data that has undergone FEC processing and does not include an error correction code.

[Disposition of Signal Processing Aggregation Device 100]

Variations in the disposition of the signal processing aggregation device 100 of the signal processing aggregation system will be explained.

Figure 6:
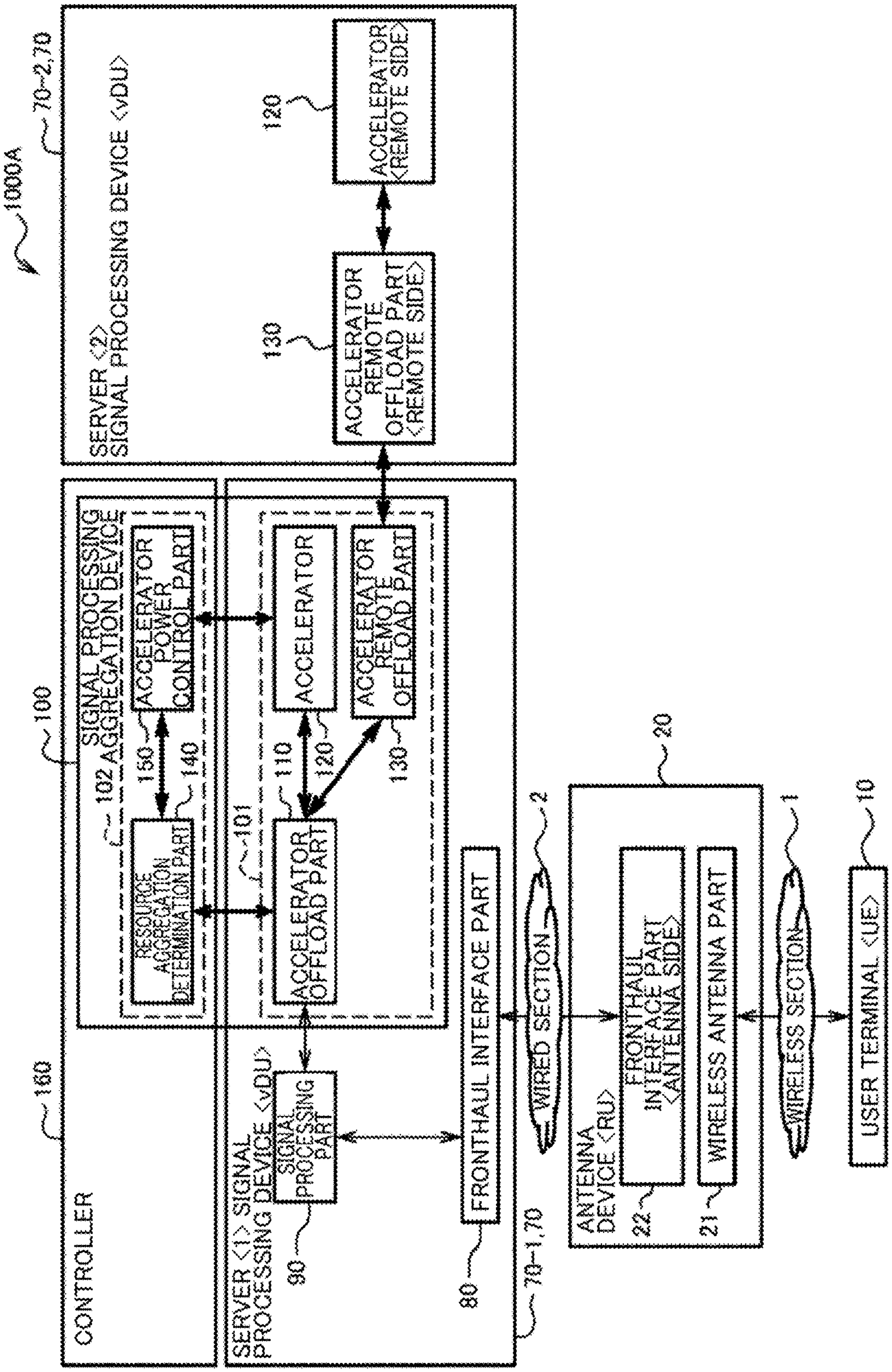
FIG. 6 is a configuration diagram showing variations in the arrangement of signal processing aggregation devices of the signal processing aggregation system according to the first embodiment of the present invention.

FIG. 6 is a configuration diagram showing variations in the disposition of the signal processing aggregation device 100 of the signal processing aggregation system. The same constituent parts as those in FIG. 3 are denoted by the same reference symbols, and the description of duplicating portions is omitted.

A signal processing aggregation system 1000A in FIG. 6 is an example in which the resource aggregation determination part 140 and the accelerator power control part 150 of the signal processing aggregation device 100 are installed in a controller 160 outside the signal processing device (vDU) 70-1.

The operation of the signal processing aggregation system 1000A configured as described above will be explained below.

[<Sequence 1> in Calculation Offloading Before Resource Aggregation is Performed]

Figure 7:
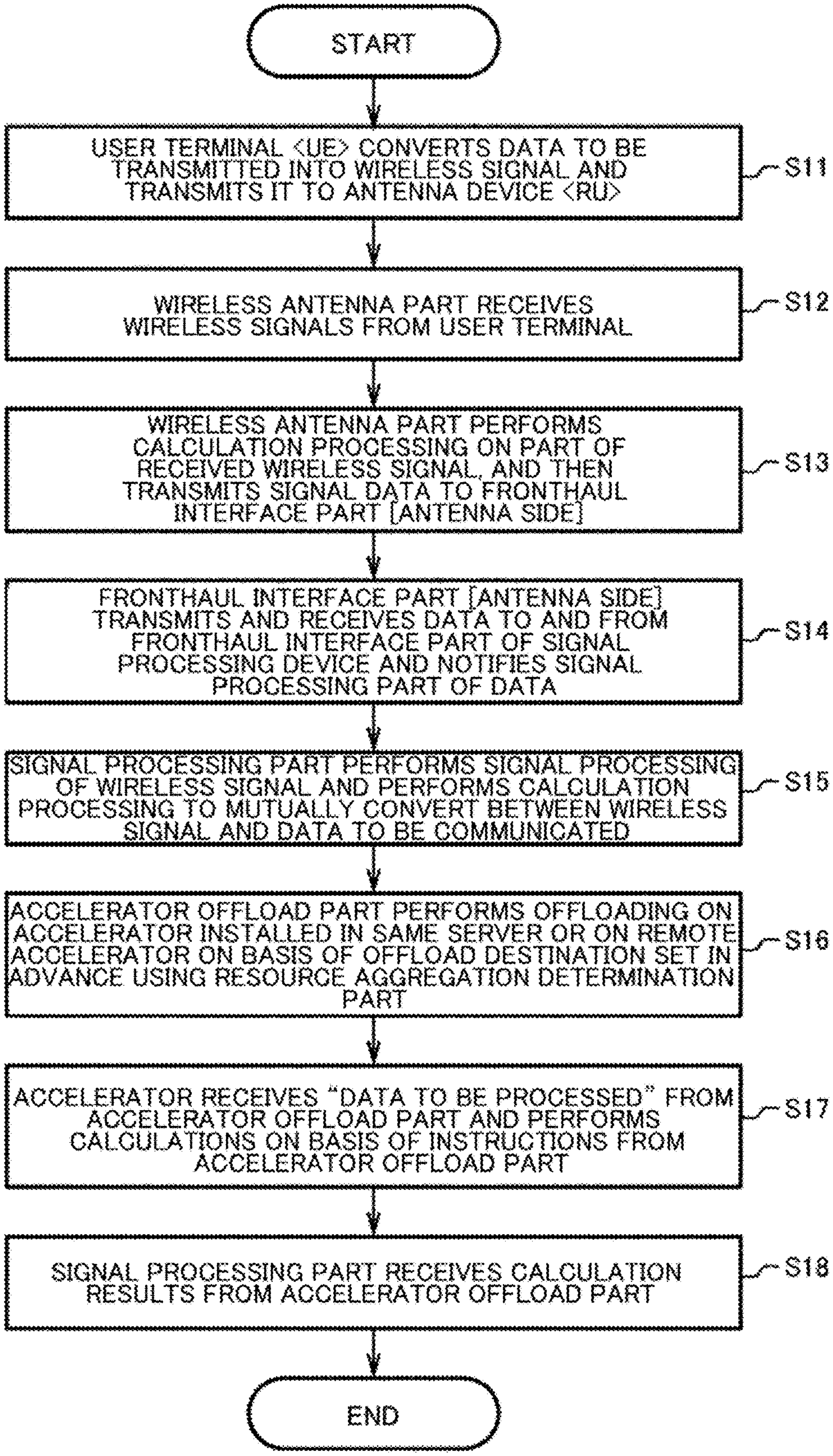
FIG. 7 is a flowchart for describing <Sequence 1> in calculation offloading before resource aggregation of the signal processing aggregation device of the signal processing aggregation system according to the first embodiment of the present invention.

FIG. 7 is a flowchart for describing <Sequence 1> in calculation offloading before resource aggregation is performed.

In Step S11, the user terminal 10 converts the data to be transmitted into a wireless signal and transmits it to the antenna device 20.

In Step S12, the wireless antenna part 21 of the antenna device 20 receives a wireless signal from the user terminal 10.

In Step S13, the wireless antenna part 21 performs calculation processing on a part of the received wireless signal, and then transmits signal data to the fronthaul interface part (antenna side) 22.

In Step S14, the fronthaul interface part (antenna side) 22 transmits and receives data to and from the fronthaul interface part 80 of the signal processing device 70-1 and notifies the signal processing part 90 of the data.

In Step S15, the signal processing part 90 of the signal processing device 70-1 performs signal processing of the wireless signal and performs calculation processing for mutually converting between the wireless signal and the data to be communicated. The signal processing part 90 notifies the accelerator offload part 110 of the signal processing aggregation device 100 to offload some processing to the accelerator.

In Step S16, the accelerator offload part 110 of the signal processing aggregation device 100 performs offloading on the accelerator 120 installed in the same server or on the accelerator (remote side) 120 of Remote Server <2> on the basis of the offload destination set in advance using the resource aggregation determination part 140.

In Step S17, the accelerator 120 receives "data to be processed" from the accelerator offload part 110 and performs calculations on the basis of instructions from the accelerator offload part 110.

In Step S18, the signal processing part 90 receives the calculation result from the accelerator offload part 110 and ends the processing of this flow.

[<Sequence 2> in Calculation Offloading During Resource Aggregation Execution]

FIG. 8 is a flowchart for describing <Sequence 2> in calculation offloading during resource aggregation execution.

This flow for determining resource aggregation is activated periodically (for example, once every 1 hour) (Step S21). Note that, in addition to the form in which it is performed periodically at fixed time intervals, as a variation, it is activated when the prediction result of the traffic prediction part 210 (which will be described later) fluctuates by a certain amount or more.

In Step S22, the resource aggregation determination part 140 determines whether to aggregate accelerator resources based on the estimation result of the amount of traffic (signal amount) to be processed.

In Step S23, the resource aggregation determination part 140 determines whether the amount of traffic to be processed exceeds a set value.

When the amount of traffic is the set value or less (Step S23: No), the resource aggregation determination part 140 instructs the accelerator offload part 110 about the aggregation destination and, in Step S24, the accelerator offload part 110 uses the accelerator remote offload part 130 to aggregate remote processing to the aggregation destination instructed by the resource aggregation determination part 140 and ends the processing of this flow.

When the amount of traffic exceeds the set value in Step S23 above (Step S23: Yes), in Step S25, the accelerator power control part 150 inputs settings relating to power saving to the accelerator 120 on the basis of the instruction (notification of power saving settings) from the resource aggregation determination part 140. As the power saving settings, "turning off the power", "setting the operating frequency", and "writing small circuits for FPGAs" are exemplified as setting contents.

In Step S26, the accelerator 120 notifies the accelerator offload part 110 of the "calculation result" and ends the processing of this flow.

[Offload Sequence <Sequence 3> During Resource Aggregation]

Figure 9:
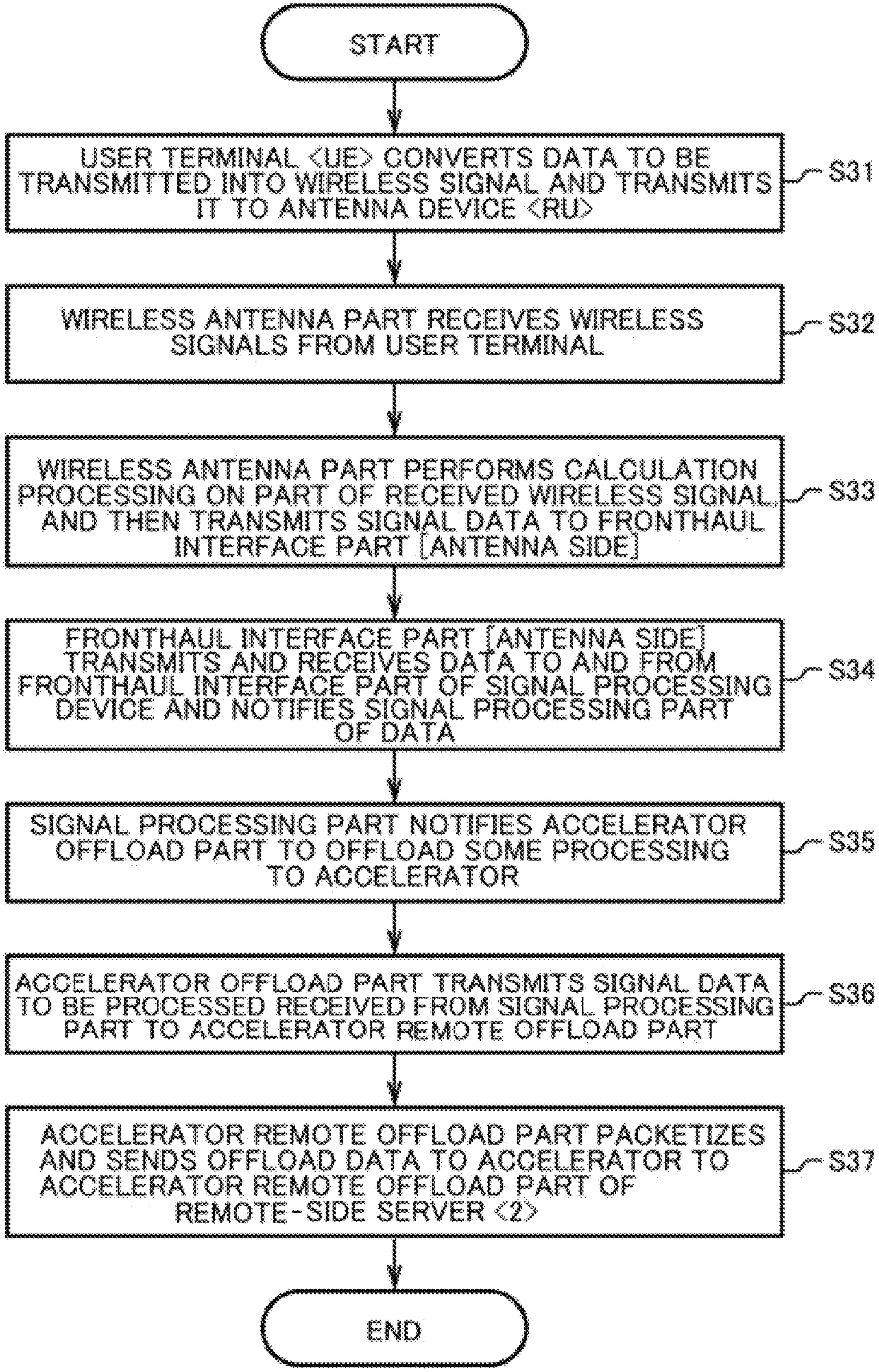
FIG. 9 is a flowchart for describing an offload sequence <Sequence 3> during resource aggregation of the signal processing aggregation device of the signal processing aggregation system according to the first embodiment of the present invention.
Figure 10:
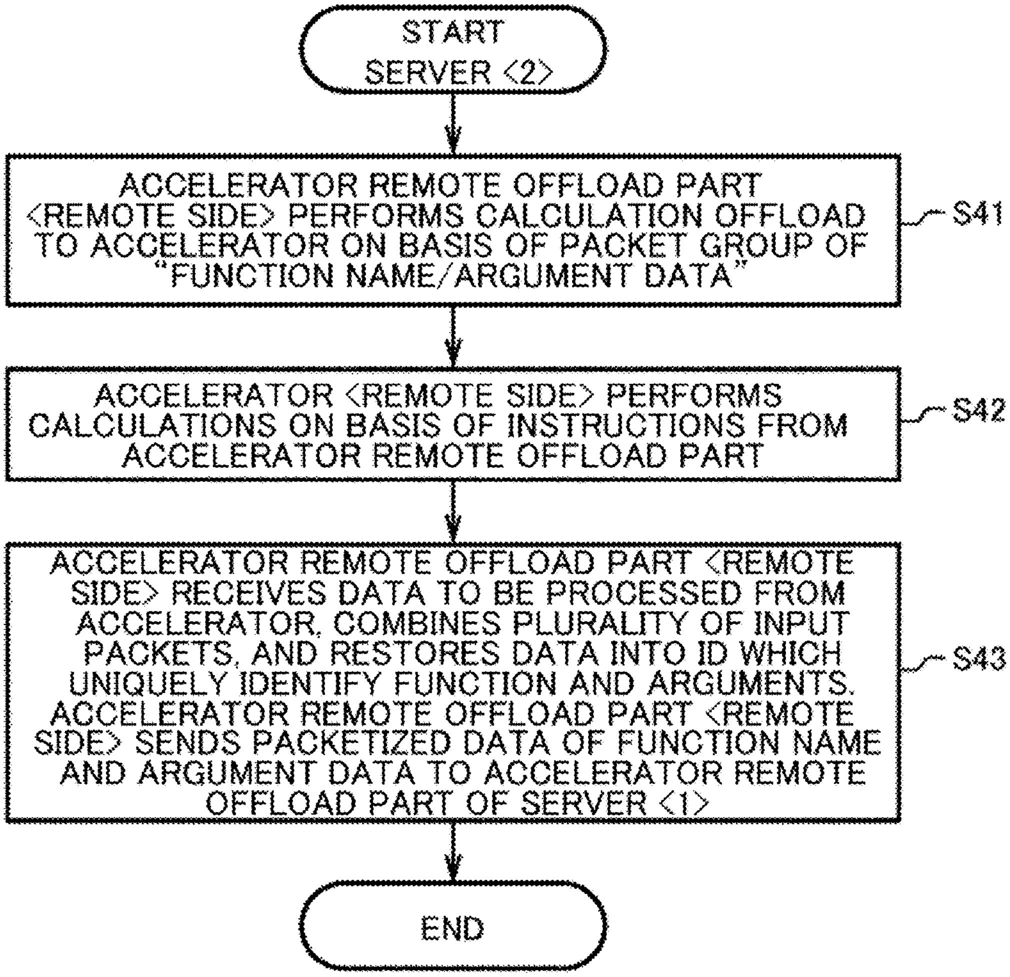
FIG. 10 is a flowchart for describing an offload sequence <Sequence 3> during resource aggregation of the signal processing aggregation device of the signal processing aggregation system according to the first embodiment of the present invention.
Figure 11:
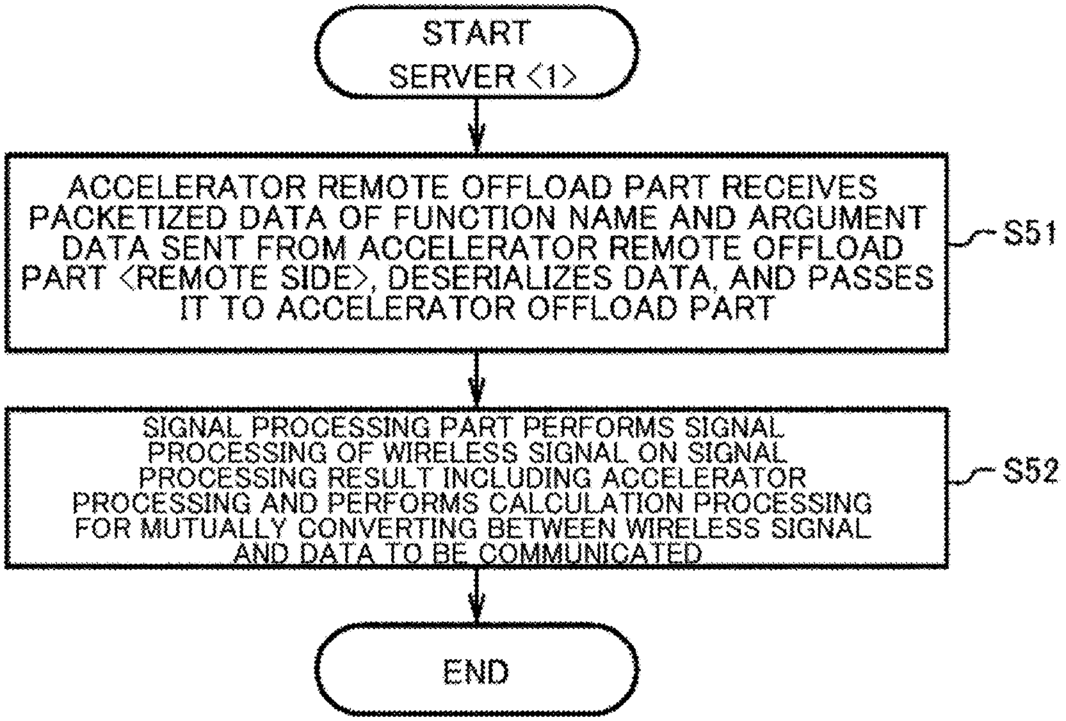
FIG. 11 is a flowchart for describing an offload sequence <Sequence 3> during resource aggregation of the signal processing aggregation device of the signal processing aggregation system according to the first embodiment of the present invention.

FIGS. 9 to 11 are flowcharts for describing the offload sequence <Sequence 3> during resource aggregation.

<Sequence 3> performs the process of Server <1> in FIG. 9 (Steps S31 to S37)→the process of Server <2> in FIG. 10 (Steps S41 to S43)→the process of Server <1> in FIG. 11 (Steps S51, S52).

The process shown in FIG. 9 in <Sequence 3> will be explained.

As shown in FIG. 9, in Step S31, the user terminal 10 converts the data to be transmitted into a wireless signal and transmits it to the antenna device 20.

In Step S32, the wireless antenna part 21 of the antenna device 20 receives a wireless signal from the user terminal 10.

In Step S33, the wireless antenna part 21 performs calculation processing on a part of the received wireless signal, and then transmits signal data to the fronthaul interface part (antenna side) 22.

In Step S34, the fronthaul interface part (antenna side) 22 transmits and receives data to and from the fronthaul interface part 80 of the signal processing device 70-1 and notifies the signal processing part 90 of the data.

In Step S35, the signal processing part 90 of the signal processing device 70-1 notifies the accelerator offload part 110 of the signal processing aggregation device 100 of offload data (signal data) to offload some processing to the accelerator.

In Step S36, the accelerator offload part 110 of the signal processing aggregation device 100 transmits the signal data to be processed received from the signal processing part 90 to the accelerator remote offload part 130.

In Step S37, the accelerator remote offload part 130 transmits packetized data of function name/argument data to the accelerator remote offload part (remote side) 130 of the signal processing part (vDU) 70-2 of the remote-side Server <2> and ends the processing of this flow. Specifically, the signal processing aggregation device 100 (FIG. 2) offloads the signal processing of the signal processing application 1 to the accelerator 120-2 (symbol dd in FIG. 2) via the NIC 53-2 (symbol bb in FIG. 2), NW connection (offload only) (symbol cc in FIG. 2), and the NIC 53-2.

The processing of Server <2> in FIG. 10 in <Sequence 3> will be explained.

As shown in FIG. 10, in Step S41, the accelerator remote offload part (remote side) 130 performs calculation offloading to the accelerator (remote side) 120 on the basis of the packet group of "function name/argument data".

In Step S42, the accelerator (remote side) 120 performs calculations based on instructions from the accelerator remote offload part (remote side) 130.

In Step S43, the accelerator remote offload part (remote side) 130 receives the data to be processed from the accelerator (remote side) 120, combines the plurality of input packets, and restore the function to the ID which uniquely identify it and arguments. The accelerator remote offload part (remote side) 130 sends the packetized data of the function name and argument data to the accelerator remote offload part 130 of Server <1> and ends the processing of this flow.

The processing of Server <1> in FIG. 11 in <Sequence 3> will be explained.

As shown in FIG. 11, in Step S51, the accelerator remote offload part 130 of Server <1> receives the packetized data of the function name and argument data from the accelerator remote offload part (remote side) 130, deserializes the data, and passes it to the accelerator offload part 110.

In Step S52, the signal processing part 90 performs signal processing of the wireless signal on the signal processing result including the accelerator processing and performs calculation processing to mutually convert between the wireless signal and the data to be communicated and ends the processing of this flow.

Second Embodiment

Figure 12:
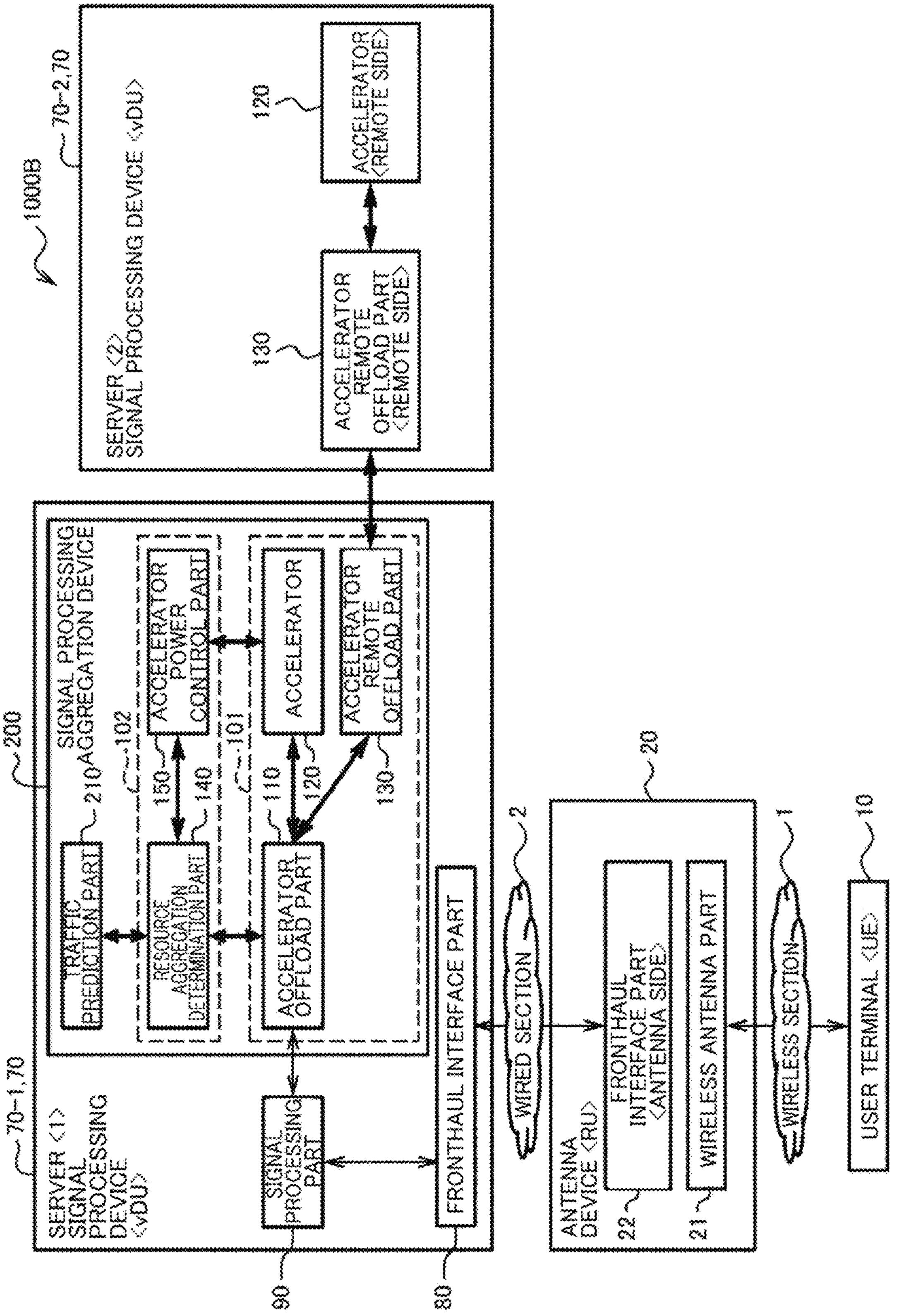
FIG. 12 is a configuration diagram of a signal processing aggregation device of a signal processing aggregation system according to a second embodiment of the present invention.

FIG. 12 is a configuration diagram of a signal processing aggregation device of a signal processing device (vDU) of a signal processing aggregation system according to a second embodiment of the present invention. The same constituent parts as those in FIG. 3 are denoted by the same reference symbols, and the description of duplicating portions is omitted.

As shown in FIG. 12, in a base station of a signal processing aggregation system 1000B, a server signal processing device (vDU) 70-1 and a server signal processing device (vDU) 70-2 are connected through a network dedicated to offloading.

The signal processing device (vDU) 70-1 includes a signal processing aggregation device 200.

The signal processing aggregation device 200 includes an accelerator offload part 110, an accelerator 120, an accelerator remote offload part 130, a resource aggregation determination part 140, an accelerator power control part 150, and a traffic prediction part 210.

The traffic prediction part 210 transmits the predicted amount of traffic to resource aggregation determination part 140. Specifically, the traffic prediction part 210 predicts the mobile phone amount of traffic for several tens of minutes in the future at the target antenna device 20 based on the time of day and weather and notifies the resource aggregation determination part 140 of the data.

The resource aggregation determination part 140 shown in FIG. 12 receives the predicted result of the amount of traffic (amount of processing to be offloaded to the accelerator) from the traffic prediction part 210 and determines whether the resource aggregation is performed based on whether it exceeds a certain value set in advance. When it is assumed that the traffic is less than the certain value, the resource aggregation determination part 140 instructs the accelerator offload part 110 with respect to the aggregation destination and uses the accelerator remote offload part 130 to aggregate processing to a remote location.

The accelerator remote offload part (remote side) 130 shown in FIG. 12 packetizes the calculation result, notifies the traffic prediction part 210 of the data, and responds with the result. The accelerator remote offload part (remote side) 130 receives a packet of "function name/argument data" from the traffic prediction part 210 as an input. The accelerator remote offload part (remote side) 130 notifies the traffic prediction part 210 of the packet data of the "calculation result" as an output.

[Hardware Configuration]

Figure 13:
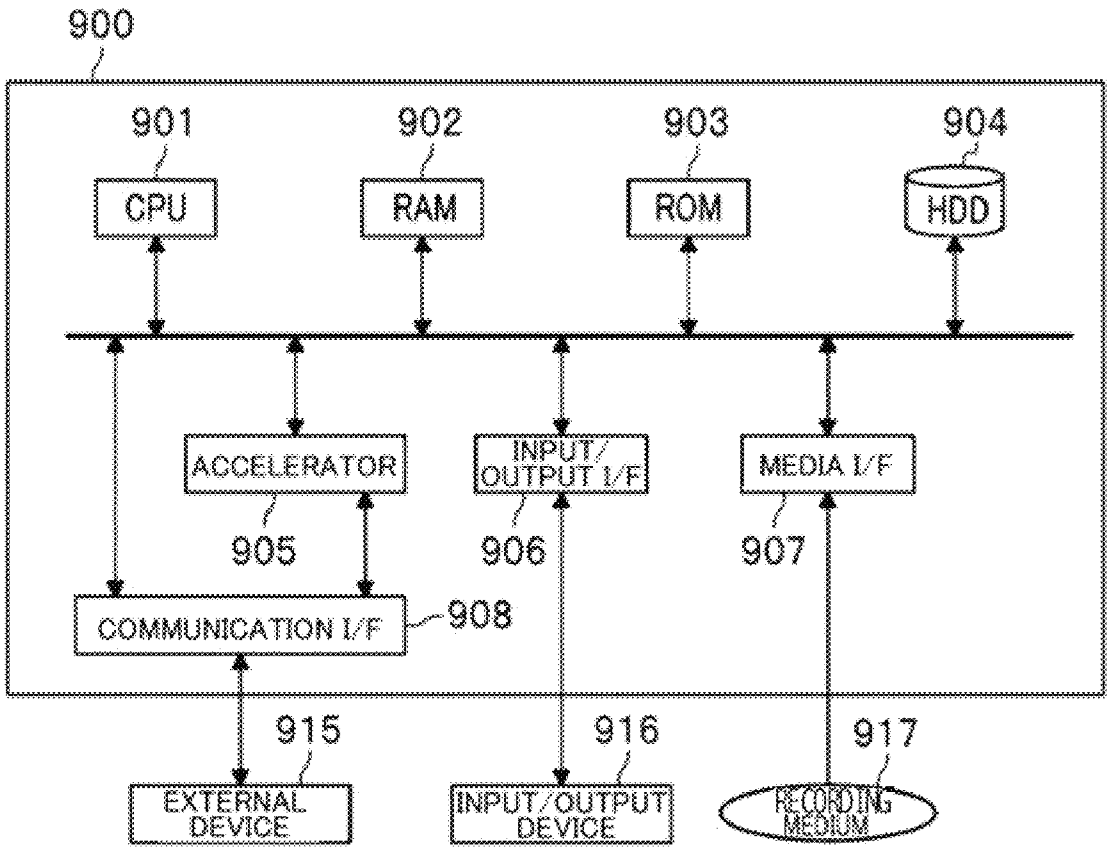
FIG. 13 is a hardware configuration diagram showing an example of a computer which implements functions of the signal processing aggregation device of the signal processing aggregation system according to the first and second embodiments of the present invention.
Figure 14:
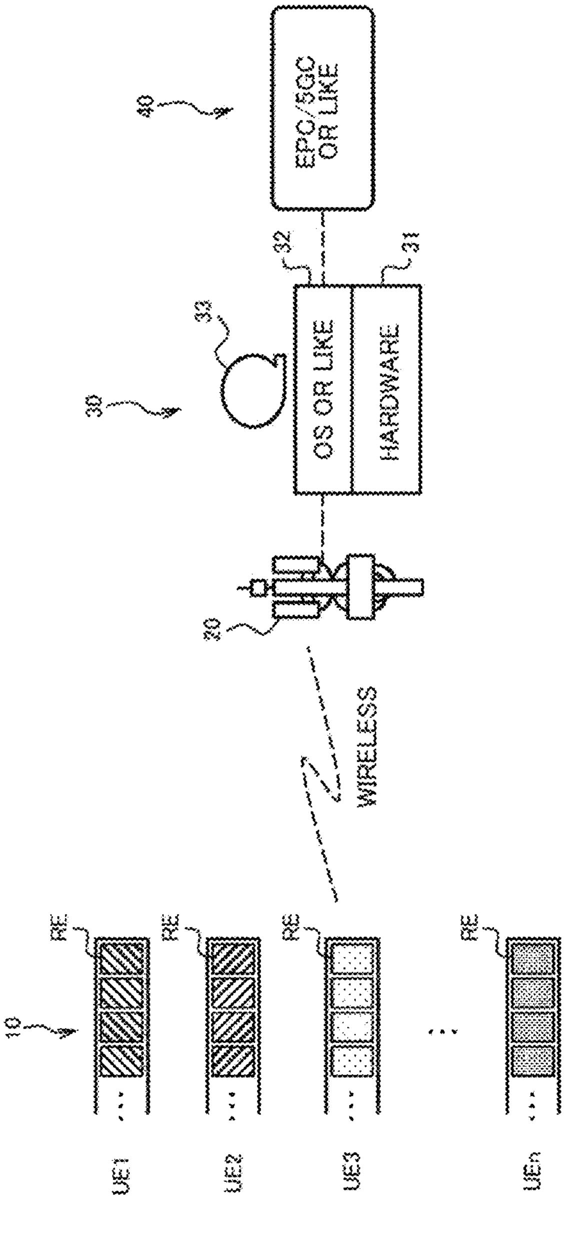
FIG. 14 is a diagram for explaining an overview of a wireless access system in the related art.
Figure 15:
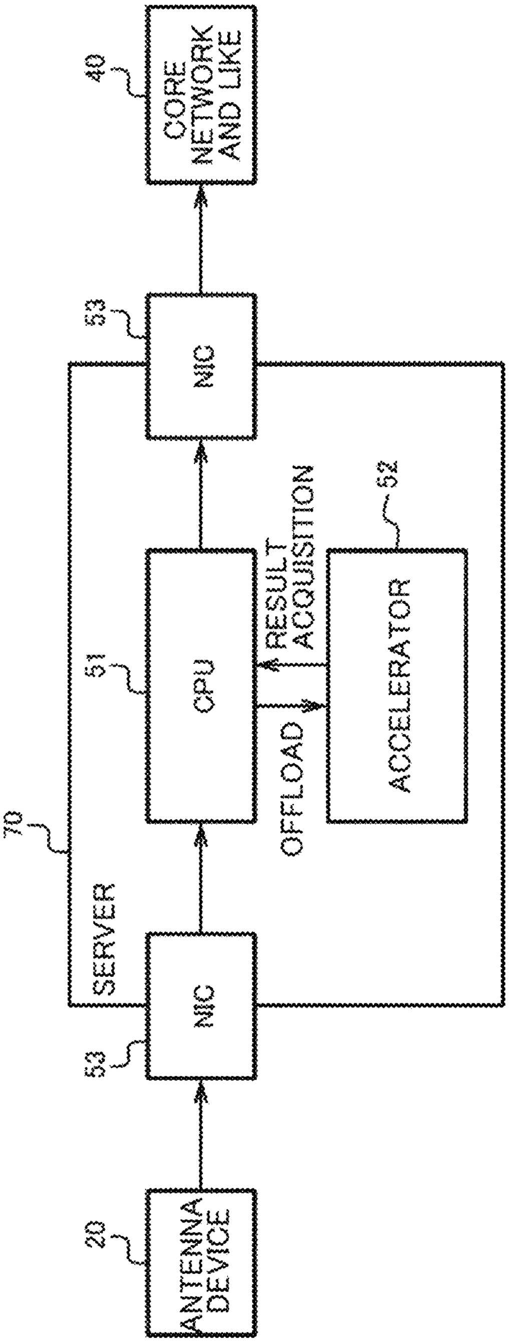
FIG. 15 is a diagram for explaining an overview of a signal processing device in a base station of the wireless access system in FIG. 14.

The signal processing aggregation devices 100, 200 (FIGS. 2, 6, and 12) of the signal processing aggregation systems 1000, 1000A, 1000B according to each of the above embodiments are realized, for example, using a computer 900 having a configuration as shown in FIG. 13.

FIG. 13 is a hardware configuration diagram showing an example of a computer 900 which implements the functions of the signal processing aggregation devices 100, 200.

The computer 900 has a CPU 901, a RAM 902, a ROM 903, an HDD 904, an accelerator 905, an input/output interface (I/F) 906, a media interface (I/F) 907, and a communication interface (I/F) 908. The accelerator 905 corresponds to the accelerator 120 in FIGS. 1, 2, 6, and 12.

The accelerator 905 is an accelerator (device) 120 (FIGS. 1, 2, 6, and 12) which processes at least one of data from the communication I/F 908 and data from the RAM 902 at high speed. Note that the accelerator 905 may be of a type (look-aside type) which returns the execution result to the CPU 901 or the RAM 902 after executing processing from the CPU 901 or the RAM 902. On the other hand, as the accelerator 905, a type (in-line type) that is inserted between the communication I/F 908 and the CPU 901 or the RAM 902 and performs processing may be used.

The accelerator 905 is connected to the external device 915 via the communication I/F 908. The input/output I/F 906 is connected to the input/output device 916. The media I/F 907 reads and writes data from the recording medium 917.

The CPU 901 operates on the basis of the program stored in the ROM 903 or the HDD 904 and controls each part of the signal processing aggregation devices 100, 200 shown in FIGS. 2, 6, and 12 by executing a program (also called an application or an abbreviated application) loaded into the RAM 902. Also, this program can also be distributed via a communication line or recorded on a recording medium 917 such as a CD-ROM.

The ROM 903 stores a boot program executed using the CPU 901 when the computer 900 is started, programs depending on the hardware of the computer 900, and the like.

The CPU 901 controls, via the input/output I/F 906, an input/output device 916 composed of input parts such as a mouse and keyboard and output parts such as a display and a printer. The CPU 901 acquires data from the input/output device 916 via the input/output I/F 906 and outputs the generated data to the input/output device 916. Note that a graphics processing unit (GPU) or the like may be used in addition to the CPU 901 as the processor.

The HDD 904 stores programs executed using the CPU 901 and data used through the programs. The communication I/F 908 receives data from other devices via a communication network (for example, network (NW)) and outputs it to the CPU 901 and also outputs data generated by the CPU 901 to other devices via the communication network.

The media I/F 907 reads a program or data stored in the recording medium 917 and outputs it to the CPU 901 via the RAM 902. The CPU 901 loads a program relating to target processing from the recording medium 917 onto the RAM 902 via the media I/F 907 and executes the loaded program. The recording medium 917 is an optical recording medium such as a digital versatile disc (DVD) or a phase change rewritable disk (PD), a magneto-optical recording medium such as a magneto optical disk (MO), a magnetic recording medium, a conductive memory tape medium, a semiconductor memory, and the like.

For example, when the computer 900 functions as the signal processing aggregation device 100, 200 configured as one device according to the embodiment, the CPU 901 of the computer 900 performs the function of the signal processing aggregation device 100, 200 by executing a program loaded on the RAM 902. Furthermore, the data in the RAM 902 is stored in the HDD 904. The CPU 901 reads a program relating to target processing from the recording medium 917 and executes it. In addition, the CPU 901 may read a program relating to target processing from another device via a communication network.

[Effects]

As explained above, when offloading specific processing of an application to an accelerator for calculation processing, the signal processing aggregation device 100, 200 which switches the offload destination accelerator (FIG. 2, FIG. 6, FIG. 12) includes an accelerator offload part 110 which performs offloading on the installed accelerator 120 or the accelerator 120 on the remote server side on the basis of the set offload destination and an accelerator remote offload part 130 which serializes signal data (offload data) to be processed by the accelerator 120 on the remote server side, packetizes it in a predetermined format, and transmits it as packetized data.

Thus, the signal processing aggregation device 100, 200 sends offload data via the network in cooperation with the accelerator remote offload part 130 and the accelerator offload part 110 which performs offloading. In this case, the calculation resources of the accelerator are aggregated without changing the networks before and after the base station server (signal processing aggregation device 100, 200). That is to say, by aggregating on an accelerator basis, the accommodation is changed between the server and the accelerator. Since the signal connections between the base stations (DU RU UE) are not changed at all and are aggregated only in the base station server, the effect of resource switching on the user terminal 10 is small. Furthermore, since there is no change in fronthaul switching or wireless connection, there is an effect that no change is required in the antenna device 20.

Furthermore, only accelerator processing can be aggregated between servers (in the embodiment, in Server <1>), and accelerator resources can be aggregated without making any changes to the fronthaul, antenna device 20, or user terminal 10. As a result, signal processing can be dynamically aggregated on a part of calculation resources without changing the user terminal, the signal processing device, and the antenna device.

The signal processing aggregation device 100, 200 includes a resource aggregation determination part 140 which determines whether to perform resource aggregation of the accelerator 120 on the basis of the amount of traffic of signal data to be processed (the amount of processing to be offloaded to the accelerator) and an accelerator power control part 150 which inputs settings relating to power saving to the installed accelerator 120 or the accelerator 120 on the remote server side on the basis of instructions from the resource aggregation determination part 140.

In this way, the accelerators are aggregated and settings relating to power saving are input (for example, the accelerators are powered off). That is to say, by aggregating empty accelerators, it is possible to increase the number of empty accelerators and turn off the power of those empty accelerators. Therefore, power saving can be achieved by turning off the power of unused accelerators/putting them into power saving mode. As a result, signal processing can be dynamically aggregated on a part of calculation resources without changing the user terminal, the signal processing device, and the antenna device, and a power saving effect can be obtained.

In the signal processing aggregation device 100, 200, when the amount of traffic is a predetermined value or less, the resource aggregation determination part 140 instructs the accelerator offload part 110 with respect to the aggregation destination and uses the accelerator remote offload part 130 to aggregate the resources to the accelerator 120 on the remote server side.

Thus, resources can be saved by concentrating resources on the accelerator 120 on the remote server side.

The signal processing aggregation device 100, 200 includes the traffic prediction part 210 which predicts the amount of traffic (amount of processing to be offloaded to the accelerator), in which the resource aggregation determination part 140 instructs the accelerator offload part 110 about the aggregation destination when the amount of traffic is a predetermined value or less on the basis of the predicted amount of traffic from the traffic prediction part 210 and the accelerator remote offload part 130 is used for aggregating resources remotely.

Thus, it is possible to control the power supply of the accelerator during offloading by determining offloading between the cases on the basis of the estimation result of the amount of communication. Therefore, power saving can be achieved by turning off the power of unused accelerators/putting them into power saving mode.

Furthermore, the signal processing aggregation system 1000, 1000A, 1000B which includes a base station configured to process wireless access signals (FIG. 1, FIG. 2, FIG. 6, and FIG. 12) includes an accelerator pool 500 in which accelerators 120 specialized for specific calculations are pooled and disposed in advance and a signal processing aggregation device 100, 200 (FIG. 2, FIG. 6, and FIG. 12) which switches the offload destination accelerator 120 when offloading specific processing of an application to an accelerator for calculation processing, in which the signal processing aggregation device 100, 200 includes an accelerator offload part 110 which selects the configured offload destination accelerator 120 from the accelerator pool 500 and performs offloading on the accelerator 120, an accelerator remote offload part 130 which serializes signal data (offload data) to be processed using the accelerator 120 pooled in the accelerator pool 500, packetizes it in a predetermined format, and transmits the packetized data, a resource aggregation determination part 140 which determines whether to perform resource aggregation of the accelerator on the basis of the amount of traffic of signal data to be processed, and an accelerator power control part 150 which inputs settings relating to power saving to the accelerator 120 which is no longer in use due to accelerator resource aggregation when performing accelerator resource aggregation on the basis of instructions from the resource aggregation determination part 140.

Thus, only the accelerator processing can be aggregated between the servers and the resource density of the accelerator can be realized without making any changes to the fronthaul, the antenna device 20, and the user terminal 10. Furthermore, it becomes possible to assign accelerator resources from the accelerator pool 500 in the required amount, thereby increasing resource utilization efficiency. As a result, signal processing can be dynamically aggregated on a part of calculation resources without changing the user terminal, signal processing device, and antenna device.

Note that, among the processes described in each of the above embodiments, all or a part of the processing described as being performed automatically may be performed manually or all or a part of the processing described as being performed manually may be performed automatically by a known method. 1. In addition, the processing procedures, control procedures, specific names, and information including various data and parameters shown in the above-mentioned documents and drawings can be changed arbitrarily, unless otherwise specified.

Furthermore, each component of each device shown in the drawings is functionally conceptual, and does not necessarily need to be physically configured as shown in the drawings. That is to say, the specific form of distributing and integrating each device is not limited to what is shown in the diagram, and all or a part of it may be functionally or physically distributed or integrated in arbitrary units depending on various loads and usage conditions.

Furthermore, each of the above-described configurations, functions, processing parts, processing means, and the like may be partially or entirely realized in hardware by, for example, designing an integrated circuit. Moreover, each of the above-described configurations, functions, and the like may be realized by software for a processor to interpret and execute a program for realizing each function. Information such as programs, tables, files, and the like which realize each function can be stored in storage devices such as memories, hard disks, or solid state drives (SSDs) or recording media such as integrated circuit (IC) cards, secure digital (SD) cards, or optical discs.

The invention claimed is:

1. A signal processing aggregation device which switches an offload destination accelerator when offloading specific processing of an application to an accelerator for calculation processing, the signal processing aggregation device comprising:

an accelerator offload part which performs offloading on the installed accelerator or the accelerator on a remote server side on the basis of a set offload destination;

an accelerator remote offload part which serializes offload data to the accelerator on the remote server side, packetizes it in a predetermined format, and transmits it as packetized data;

a resource aggregation determination part which determines whether to perform resource aggregation of the accelerator on the basis of a processing amount of signal data to be processed to be offloaded to the accelerator; and an accelerator power control part which inputs settings relating to power saving to the installed accelerator or the accelerator on a remote server side on the basis of instructions from the resource aggregation determination part, wherein the resource aggregation determination part, when the amount of processing to be offloaded to the accelerator is a predetermined value or less, instructs the accelerator offload part with respect to an aggregation destination and uses the accelerator remote offload part to aggregate the processing to the accelerator on the remote server side, and wherein the resource aggregation determination part instructs the accelerator power control part to save power on an unused accelerator power supply.

2. The signal processing aggregation device according to claim 1, comprising:

a traffic prediction part which predicts an amount of processing to be offloaded to the accelerator, wherein, when an amount of traffic is a predetermined value or less on the basis of a predicted amount of traffic from the traffic prediction part, the resource aggregation determination part instructs the accelerator offload part with respect to an aggregation destination and uses the accelerator remote offload part to aggregate resources to a remote location.

3. A signal processing aggregation system which includes a base station configured to process a wireless access signal, the signal processing aggregation system comprising:

an accelerator pool which pools and disposes accelerators specialized for specific calculations in advance; and a signal processing aggregation device which switches an offload destination accelerator when offloading specific processing of an application to an accelerator for calculation processing, wherein the signal processing aggregation device includes:

an accelerator offload part which selects a set offload destination accelerator from the accelerator pool and performs offloading on the accelerator;

an accelerator remote offload part which serializes offload data to accelerators pooled in the accelerator pool, packetizes it in a predetermined format, and transmits it as packetized data;

a resource aggregation determination part which determines whether to perform resource aggregation of accelerators on the basis of the processing amount of signal data to be processed to be offloaded to the accelerator; and an accelerator power control part which inputs settings relating to power saving to the accelerator which is no longer in use due to resource aggregation of the accelerator when resource aggregation of the accelerator is performed on the basis of instructions from the resource aggregation determination part, wherein the resource aggregation determination part, when the amount of processing to be offloaded to the accelerator is a predetermined value or less, instructs the accelerator offload part with respect to an aggregation destination and uses the accelerator remote offload part to aggregate the processing to the accelerator on the remote server side, and wherein the resource aggregation determination part instructs the accelerator power control part to save power on an unused accelerator power supply.

4. A signal processing aggregation method for a signal processing aggregation device which switches an offload destination accelerator when offloading specific processing of an application to an accelerator for calculation processing, in which the signal processing aggregation device performs a step of performing offloading on the installed accelerator or on the accelerator on a remote server side on the basis of a set offload destination;

a step of serializing offload data to be processed by the accelerator on the remote server side, packetizing it in a predetermined format, and transmitting it as packetized data;

a step of determining whether to perform resource aggregation of the accelerator on the basis of a processing amount of signal data to be processed to be offloaded to the accelerator; and a step of inputting settings relating to power saving to the installed accelerator or the accelerator on a remote server sidet, wherein the signal processing aggregation device, when the amount of processing to be offloaded to the accelerator is a predetermined value or less, performs aggregating the processing to the accelerator on the remote server side, and saving power on an unused accelerator power supply.

5. A non-transitory computer-readable medium storing a computer program causing a computer to function as the signal processing aggregation device according to claim 1.

* * * * *